United States Patent [19]
Wu et al.

[11] 3,832,700
[45] Aug. 27, 1974

[54] FERROELECTRIC MEMORY DEVICE

[75] Inventors: Shu-Yau Wu; Maurice Hubert Francombe, both of Pittsburgh, Pa.

[73] Assignee: Westinghouse Electric Corporation, Pittsburgh, Pa.

[22] Filed: Apr. 24, 1973

[21] Appl. No.: 354,022

[52] U.S. Cl. .......... 340/173.2, 307/304, 317/335 B, 340/173 R
[51] Int. Cl. .......... G11c 11/22, G11c 11/40
[58] Field of Search .......... 340/173 R, 173.2; 317/235 B; 307/304

[56] References Cited

UNITED STATES PATENTS

| | | | |
|---|---|---|---|
| 2,791,758 | 5/1957 | Looney | 340/173 |
| 2,791,761 | 5/1957 | Morton | 340/173 |
| 3,646,527 | 2/1972 | Wada et al. | 340/173 R |

OTHER PUBLICATIONS

Scott et al., Ferroelectric Thin Films for Optical Signal Processing, IBM Technical Disclosure Bulletin, Vol. 13, No. 11, 4/71, pp. 3,240–3,241.

Arnett, Ferroelectric FET Device, IBM Technical Disclosure Bulletin, Vol. 15, No. 9, 2/73, p. 2,825.

*Primary Examiner*—Stuart N. Hecker
*Attorney, Agent, or Firm*—D. Schron

[57] ABSTRACT

A ferroelectric memory device utilizing the remanent polarization of a thin, ferroelectric film to control the surface conductivity of a bulk semiconductor and perform the memory function. The structure of the device is similar to a conventional MIS field effect transistor with the exception that the gate insulating layer is replaced by a thin film of active ferroelectric material comprising a reversably polarizable dielectric exhibiting hysteresis.

8 Claims, 6 Drawing Figures

FERROELECTRIC MEMORY DEVICE

BACKGROUND OF THE INVENTION

As is known, memory elements have been developed that utilize the hysteresis effects observed with certain insulators in MIS field effect transistors. In certain prior art approaches to the application of transistors to provide information storage, the transistors, which exhibit no hysteresis, are combined into a circuit that does exhibit hysteresis. Memory function is then a property of the circuit; and this requires many elements to achieve a single bit storage.

The usual form of transistor memory element is a standard insulated-gate field effect transistor structure in which the silicon dioxide gate insulator is replaced by a double insulator, typically a layer of silicon dioxide near the silicon substrate and a layer of silicon nitride over the silicon dioxide. This structure is commonly called a metal-nitride-oxide semiconductor memory transistor. The hysteresis of the device is associated with the existence of traps (electronic states) at or near the silicon dioxide-silicon-nitride interface, the threshold voltage of the transistor being influenced by the charged state of the traps.

It is also known that ferroelectric materials exhibit a hysteresis effect. Such ferroelectric materials have been used to modulate the surface conductivity of a bulk semiconductor. See, for example, U.S. Pat. Nos. 2,791,758–761, issued May 7, 1957. The ferroelectric material used in the aforesaid patents is a separately-grown crystal of guanidinium aluminum sulfate hexahydrate which is placed in contact with the surface of a semiconductor crystal. The air gap between the two surfaces was minimized by carefully polishing the surfaces; or in another case, the gap was filled with a dielectric such as ethylene cyanide or nitrobenzene. The experimental results with such devices, however, were not entirely successful, apparently due to the poor modulation efficiency of the ferroelectric polarization and a low spontaneous polarization of the guanidinium aluminum sulfate hexahydrate.

Semiconductor films have been deposited by vacuum evaporation on ferroelectric crystals and on ferroelectric ceramic substrates. These ferroelectric field effect devices in general can be divided into two categories. One is the adaptive resistor and the other the adaptive transistor. The former is fabricated by depositing a semiconducting layer, and the latter by depositing a semiconductive thin film transistor on a ferroelectric crystal or ceramic substrate. All of these devices employ a bulk ferroelectric; and conductivity modulation was observed only in the thin films. The difficulty with such devices is that thay all suffer from an electrical instability associated with the thin film semiconducting material. That is, the electrical conductivity and the transconductance in either the ON or OFF state will drift and decay into an intermediate state with time.

SUMMARY OF THE INVENTION

In accordance with the present invention, a ferroelectric memory device is provided which utilizes the remanent polarization of a ferroelectric thin film to control the surface conductivity of a bulk semiconductor and perform the memory function. Thus, in contrast to prior art devices wherein a thin film semiconductor was deposited on a bulk ferroelectric, or a crystal of the ferroelectric was placed in contact with a bulk semiconductor substrate, the ferroelectric in this case is deposited as a thin polycrystalline film, preferably by RF sputtering techniques, onto a semiconductor substrate. The device structure is similar to a conventional metal-insulator-semiconductor (MIS) field effect transistor with the exception that the gate insulating layer is now replaced by a layer of an active ferroelectric material.

Specifically, there is provided in accordance with the invention a ferroelectric memory device comprising (1) a substrate of semiconductive material of one type conductivity, (2) spaced regions of the opposite type conductivity formed in a surface of the substrate, (3) a film of ferroelectric material spanning the space between said regions, (4) means connecting the spaced regions to external circuitry, and (5) means for establishing a potential between the substrate and the side of the film of ferroelectric material opposite the substrate whereby the remanent polarization of the ferroelectric film will establish the surface conductivity of the substrate between said regions after the potential is removed.

When a potential of one polarity is applied between the gate electrode of the ferroelectric material and the semiconductive substrate and then removed, a persisting inversion layer or conducting channel will be formed between the spaced regions due to the remanent polarization of the ferroelectric material. On the other hand, when a potential of opposite polarity is applied, the channel will be presistently depleted and the device acts, essentially, as an open switch with no current flowing between the spaced regions which correspond to the source and drain of a field effect transistor.

The above and other objects and features of the invention will become apparent from the following detailed description taken in connection with the accompanying drawings, which form a part of this specification and in which.

Figures 3A, 3B, 3C, 3D:
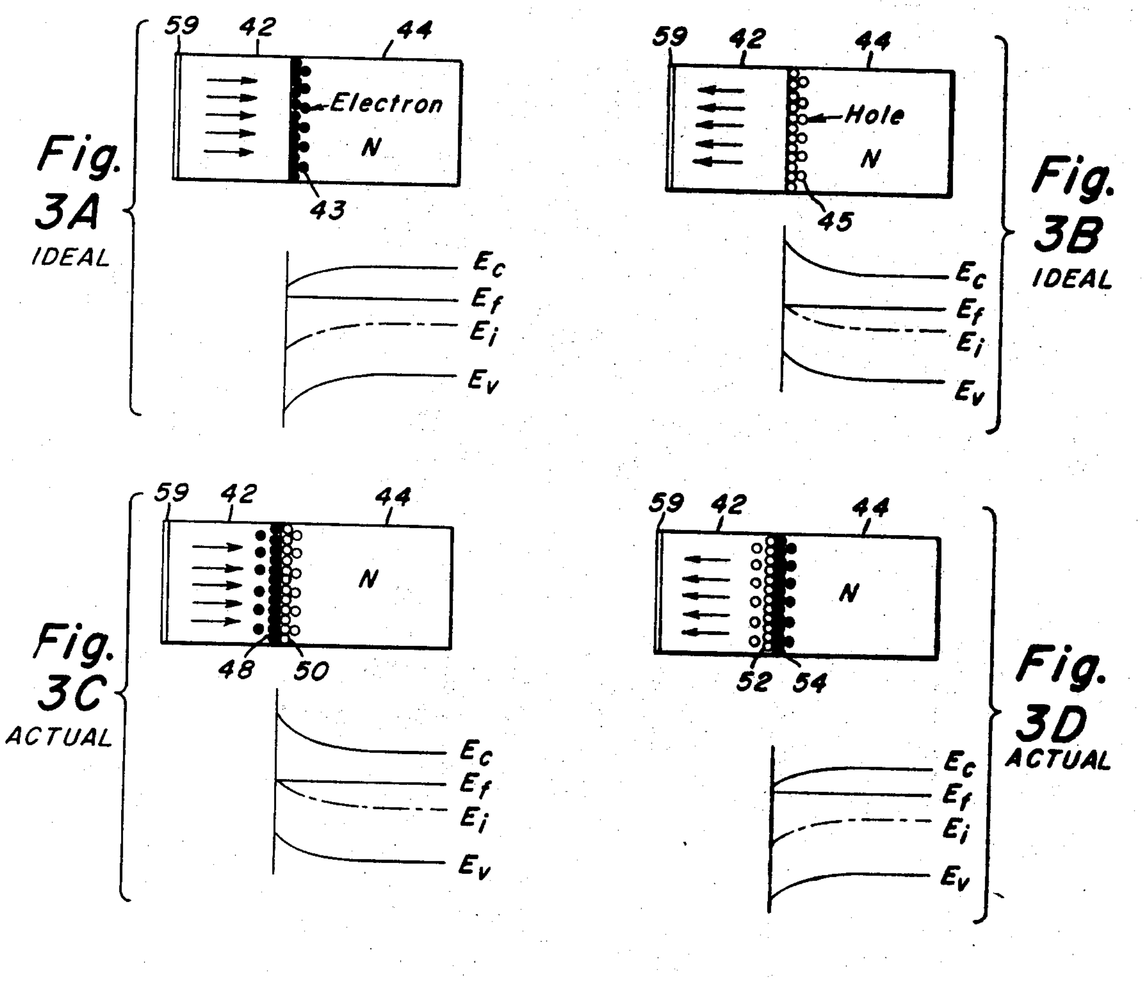

FIG. 3A schematically illustrates the ideal manner (with no injection) in which an accumulation of the majority carriers, electrons, is formed at the semiconductor surface, and the resulting energy bands, when a film of ferroelectric material, subjected to a remanent polarization field in the direction shown, is present on an N-type semiconductor substrate;

FIG. 3B schematically illustrates the ideal manner (with no injection) in which an inversion layer is formed, and the resulting energy bands, when a film of ferroelectric material, subjected to a remanent polarization field in the direction shown, is present on an N-type seniconductive substrate;

FIG. 3C schematically illustrates the actual situation and energy band structure for devices on an N-type semiconductor, showing injection of electrons 48 into the ferroelectric due to application of a positive voltage to the metal 59. When the field is removed a hole inversion layer is formed at the semiconductor surface; and FIG. 3D illustrates the actual situation and energy band structure for devices formed on an N-type semiconductor, showing injection of holes 52 into the ferroelectric due to application of a negative voltage to the metal 59. When the field is removed an accumulation layer of electrons 54 is formed at the semiconductor surface.

Figure 1:
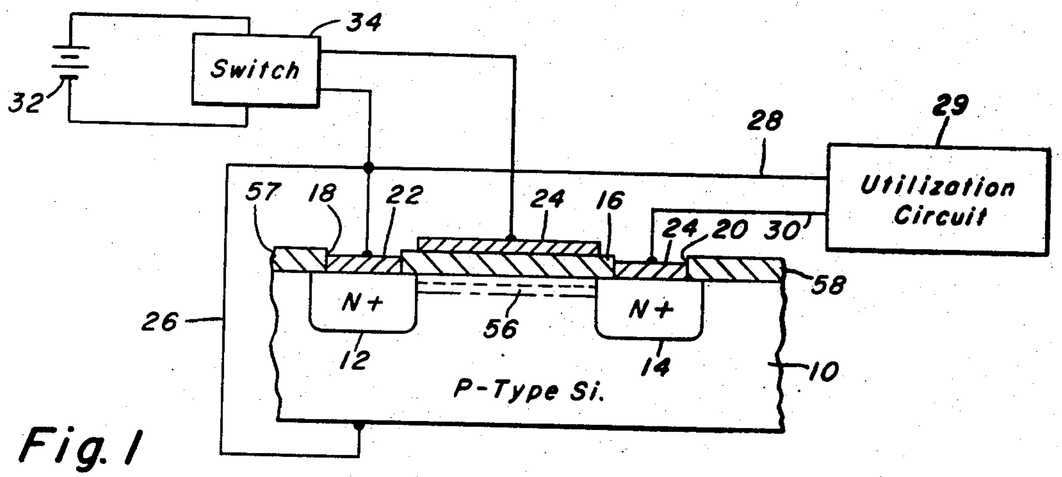
FIG. 1 is a cross-sectional view of the ferroelectric memory device of the invention.

With reference now to the drawings, and particularly to FIG. 1, the device shown includes a substrate of P-type silicon 10 having diffused therein spaced N+ regions 12 and 14 intersecting the upper surface of the substrate. Between the N+ regions 12 and 14 is a layer of ferroelectric material 16. Formed in the film 16 are openings 18 and 20 provided with metalizations 22 and 24 such as aluminum. On top of the layer of ferroelectric material 16, and spanning the space between N+ regions 12 and 14, is a matallization 24. It will be immediately apparent that the structure shown in FIG. 1 is similar to a MIS field effect transistor wherein the metallization 24 forms the gate electrode; while the metallizations 22 and 24 form the source and drain electrodes, respectively. Elements 57 and 58 are insulating layers such as silicon dioxide.

The source electrode 22 is connected to the substrate 10 via lead 26. The source and drain electrodes 22 and 24 are connected to a utilization circuit 29, the device acting as a switch in the circuit formed by leads 28 and 30. A positive or negative bias may be applied by battery 32 between the gate electrode 24 and the substrate 10 by reversing a switch 34.

The thin film ferroelectric material 16 is preferably a bismuth titanate, $Bi_4Ti_3O_{12}$; however it may comprise any one of the known reversibly polarizable ferroelectric materials which can be deposited on the upper surface of the substrate 10. All such materials are characterized in thay they possess dipoles which will align parallel to an applied electric field and will remain aligned after the field is removed. Bismuth titanate is preferred since it can be most readily formed by RF sputtering techniques on a substrate, such as substrate 10. A typical film thickness is about 3 microns; however in some cases it can be made thinner, just so long as dielectric breakdown will not occur at the applied bias voltage. As thickness increases, so does the magnitude of the applied bias necessary to produce a desired surface conductivity effect.

Figure 2:
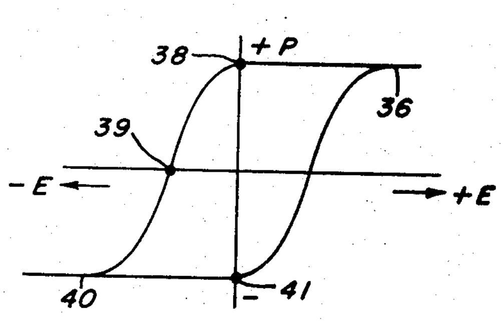
FIG. 2 illustrates the hysteresis effect of the ferroelectric material used in the invention.

Ferroelectric materials can be compared to magnetic materials; however instead of being polarized by a magnetic field, they are polarized by an electric field. Furthermore, they exhibit a hysteresis effect similar to that of a magnetic material. This is shown in FIG. 2. As the electric field, E, is increased in the positive direction, the value of switched polarization, P, will advance along the hysteresis curve until a saturation level 36 is reached. When the electric field is removed, the polarization will not reduce back to zero but rather will assume a value established by point 38, this being the remanent polarization of the ferroelectric material. Now, when the applied field is reversed and exceeded beyond the coercive field, point 39, the material will again saturate at a negative value or level of saturation polarization 40; and when the negative field is removed, the remanent polariation will be established at point 41. Thus, applying a field of one polarity across the ferroelectric high enough to saturate the polarization and then removing it establishes a remanent polarization which will persist for a relatively long period of time. Applying a field of the opposite polarity will also establish remanent polarization, but of the opposite polarity or sense.

The manner in which the surface conductance of the semiconductive substrate can be controlled by an overlying layer of ferroelectric material can best be understood by reference to FIGS. 3A-3D. Ideally (assuming no interface states and no bound charges in the ferroelectric) when a positive external field whose magnitude is larger than the coercive field of the ferroelectric material is applied to the metal electrode 59, the polarization in the ferroelectric will be aligned towards the ferroelectric-semiconductor interface. When the external field is removed, the remanent polarization will induce a field which attracts negative compensation charge 43 (electrons) to the semiconductor surface. For an N-type semiconductor this will create a charge accumulation layer. The energy bands of the semiconductor at the interface will bend downward as shown in FIG. 3A. When a negative field is next applied to the metal electrode, the polarization in the ferroelectric will be reversed. The field induced by the remanent polarization, in this case, will attract positive compensation charge 45 (holes) to the semiconductor surface. The carrier density of a P-type semiconductor at the interface will be enhanced, and that of N-type will be depleted or inverted. The semiconductor energy bands at the interface will bend upward as shown for the N-type substrate in FIG. 3B.

In devices showing injection or extraction of carriers at the ferroelectric-semiconductor interface, however, when an external field is applied between the metal electrode 59 and an underlying N-type substrate 44, injection of electrons or holes depending upon the polarity of the applied field, occurs from the semiconductor into the ferroelectric. These injected carriers will be attracted by the remanent polarization field and bound to ferroelectric domains when the applied field is removed. This gives the device a memory capability. Because of the bound carriers in the ferroelectric, charge of opposite polarity will be induced at the semiconductive surface. The semiconductive surface will be depleted, inverted or enhanced, depending upon the polarity and the amount of the bound carriers.

Thus, as shown in FIG. 3C, application of a potential by battery 32 across the ferroelectric-substrate combination such that the metal electrode is positive with respect to the N-type substrate will cause injection of electrons 48 into the ferroelectric 42 adjacent the upper surface of the substrate. These injected electrons remain even though the applied field is removed. Because of the injection of electrons 48 at the ferroelectric-substrate interface, holes 50 are induced at the surface of the N-type substrate after the applied field is removed, thereby forming a P-type channel. The energy band diagram for the system just described is also shown in FIG. 3C. This shows that holes are induced at the semiconductive surface and the semiconductor energy bands at the surface bend upward.

On the other hand, when the polarity of the applied bias from battery 46 is reversed as shown in FIG. 3D, holes 52 will be injected into the ferroelectric from the semiconductor. These holes persist even after the bias is removed and form a charge accumulation layer 54 of electrons at the upper surface of the substrate 44. The resulting surface energy bands of the semiconductor shown in FIG. 3D bend downwardly.

Applying these principles to the device of FIG. 1, it will be appreciated that for an ideal device when the electrode 24 is positive with respect to the P-type substrate 10, electrons will be attracted to the semiconductor surface, thereby forming an inversion layer 56 and a resulting N-type conducting channel between the N+ regions 12 and 14. This N-type channel will persist even after the applied bias is removed. The device, as viewed from the utilization circuit 29, will appear as a closed switch. On the other hand, when the polarity of the applied bias is reversed such that the gate electrode 24 is negative with respect to the P-type substrate 10, holes will be attracted to the semiconductor surface, thereby forming a charge accumulation layer such that the device appears to the utilization circuit 29 as an open switch.

For devices showing injection and extraction of carriers at the ferroelectric-semiconductor interface, the situation is slightly different. When the electrode 24 is negative with respect to the P-type substrate 10, holes will be injected into the ferroelectric layer 16. After the external field is removed, an inversion layer 56 is formed which results in an N-type conducting channel between the N+ regions 12 and 14. This N-type channel will persist even with no potential applied to the gate electrode 24. The device, as viewed from the utilization circuit 29, will appear as a closed switch. On the other hand, when the polarity of the applied bias is reversed such that the gate electrode 24 is positive with respect to the P-type substrate 10, electrons will be injected from the P-type substrate into the ferroelectric layer 16. After the external field is removed, a charge accumulation layer is formed and the channel is depleted at the semiconductor surface. The device then appears to the utilization circuit 29 as an open switch. Thus, in both cases, once the device is pulsed by momentarily closing switch 34, it remains an open or closed switch, depending upon the polarity of the applied bias. Assuming that an N-type channel 56 is formed as shown in FIG. 1 and the device acts as a closed switch, this condition can be reversed by momentarily pulsing the device with a positive bias.

The device of the present invention has a number of advantages over other memory devices, such as ferroelectric field-effect devices made by depositing a semiconductive thin film transistor on a bulk ferroelectric. The device of the invention is much more stable than prior art ferroelectric field effect memory devices incorporated with a semiconductive thin film transistor due to the fact that it does not have the electrical instability associated with the semiconductive thin film transistor. The device will operate at a lower switching voltage due to the use of a thin ferroelectric film instead of a bulk ferroelectric crystal substrate used by prior art devices. It also has a higher field effect mobility because of the use of a bulk semiconductive substrate and a higher transconductance due to the high dielectric constant of the gate insulating layer. Fabrication processes for the device of the invention are also simpler and compatible with planar silicon technology.

As an example of the invention, a film of bismuth titanate was deposited at about 730°C on a silicon wafer to a thickness of about 3 to 4 microns using RF sputtering techniques. The substrate was 10 to 40 ohm-centimeter P-type silicon. The distance between the N+ regions 12 and 14 was 3 mils. The channel width, which is in the direction perpendicular to the plane of FIG. 1, was 30 mils. A 1 millisecond −20 volt short rectangular pulse was applied between the gate and source electrodes 22 and 24 resulting in a drain saturation current of about 80 microamperes. This current, of course, would be higher if a higher and longer negative pulse were employed. When the same device was poled with a +20 volt 1 millisecond rectangular pulse between the gate and source, it was completely cut off. Under these latter circumstances, the drain current was not detectable even when the gate voltage was increased in 5 steps to +5 volts. The device is stable in both ON and OFF states after the poling field is removed.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. A ferroelectric memory device comprising a substrate of bulk semiconductive material of one type of conductivity, spaced regions of the opposite type conductivity formed in a surface of the substrate, a film of crystalline ferroelectric material spanning the space between said regions and in intimate contact with said substrate, said film exhibiting hysteresis means connecting said spaced regions to external circuitry, and means for establishing a potential between said substrate and the side of said film of ferroelectric material opposite the substrate whereby the remanent polarization of the ferroelectric layer will establish the surface conductivity of the substrate between said regions after the potential is removed.

2. The memory device of claim 1 wherein said film is formed by sputtering techniques.

3. The memory device of claim 1, with no injection and extraction of carriers at the ferroelectric-semiconductor interface, wherein said substrate is formed from P-type semiconductive material, said spaced regions are N+-type, and wherein an inversion layer defining an N-type channel connecting said N+-type regions is formed when a potential is applied and then removed between said ferroelectric film and said substrate such that the film is positive with respect to the substrate.

4. The memory device of claim 1, with no injection and extraction of carriers at the ferroelectric-semiconductor interface, wherein said substrate is formed from N-type semiconductive material and said spaced regions are P+-type, and wherein an inversion layer forming a P-type channel between said P+-type regions is formed when a potential is applied and then removed between said ferroelectric film and said substrate such that the film is negative with respect to the substrate.

5. The memory device of claim 1, with injection and extraction of carriers at the ferroelectric-semiconductor interface, wherein said substrate is formed from P-type semiconductive material, said spaced regions and N+-type, and wherein an inversion layer defining an N-channel connecting said N+-type regions is formed when a potential is applied and then removed between said ferroelectric film and said substrate such that the film is negative with respect to the substrate.

6. The memory device of claim 1, with injection and extraction of carriers at the ferroelectric-semiconductor interface, wherein said substrate is formed from N-type semiconductive material and said spaced regions are P+-type, and wherein an inversion layer forming a P-type channel between said P+-type regions is formed when a potential is applied and then removed between said ferroelectric film and said substrate such that the film is positive with respect to the substrate.

7. The memory device of claim 1 including metallizations in contact with said spaced regions and a metallization overlying said film of ferroelectric material spanning the space between said regions, the metallization over said ferroelectric film acting as a gate electrode and the metallization in contact with said spaced regions forming the source and drain electrodes of a field effect transistor structure.

8. The memory device of claim 1 wherein said ferroelectric material comprises bismuth titanate.

* * * * *